United States Patent [19]
Bryant et al.

[11] Patent Number: 5,698,910
[45] Date of Patent: Dec. 16, 1997

[54] ELECTROMAGNETIC ACTUATOR WITH POSITION SENSOR

[75] Inventors: Robert Cooper Bryant, Honeoye Falls; Michael Joseph O'Brien, Rochester, both of N.Y.; Michael Allan Leetmaa, Madison, Wis.

[73] Assignee: Eastman Kodak Company, Rochester, N.Y.

[21] Appl. No.: 577,287

[22] Filed: Dec. 22, 1995

[51] Int. Cl.$^6$ .................................................. H02K 41/00
[52] U.S. Cl. ................................................ 310/12; 318/135
[58] Field of Search ......................... 310/12, 13, 14; 318/135; 361/152; 335/234, 246, 256; 324/207.16, 207.15

[56] References Cited

U.S. PATENT DOCUMENTS

| | | | |
|---|---|---|---|
| Re. 34,870 | 3/1995 | Cummins et al. | 318/687 |
| 2,430,757 | 11/1947 | Conrad et al. | 336/131 X |
| 3,777,255 | 12/1973 | Young et al. | 336/45 X |
| 4,352,048 | 9/1982 | Schulze | 318/135 |
| 4,421,118 | 12/1983 | Dow et al. | 310/15 X |
| 4,510,420 | 4/1985 | Sasso | 310/24 X |
| 4,641,072 | 2/1987 | Cummins | 318/687 |
| 4,656,400 | 4/1987 | Pailthorp et al. | 318/135 |
| 4,675,603 | 6/1987 | Rajakovics | 336/45 X |
| 4,872,124 | 10/1989 | Shimizu et al. | 364/571.03 |
| 4,906,880 | 3/1990 | Miura | 310/29 |
| 5,057,724 | 10/1991 | Patton | 310/17 |
| 5,172,298 | 12/1992 | Shimizu et al. | 361/152 |
| 5,216,364 | 6/1993 | Ko et al. | 324/207.24 |

*Primary Examiner*—Steven L. Stephan
*Assistant Examiner*—Judson H. Jones
*Attorney, Agent, or Firm*—Charles E. Snee, III; David A. Howley

[57] ABSTRACT

A core made of a soft magnetic material is supported to be movable, and a permanent magnet is mounted to move with the core. At least one electrically conductive drive coil is located adjacent the core and one pole of the permanent magnet. A casing, made of a soft magnetic material, is located adjacent to the drive. An electrically conductive sense coil is located adjacent one end of the core, such that when electrical current is passed through the drive coil in a first direction, the core is moved in a first direction and an electrical property associated with the sense coil is altered, thereby indicating the position of the core, and when electrical current is passed through the drive coil in a second direction, the core is moved in a second direction and an electrical property associated with the sense coil is altered, thereby indicating the position of the core.

22 Claims, 6 Drawing Sheets

ELECTROMAGNETIC ACTUATOR WITH POSITION SENSOR

FIELD OF THE INVENTION

The invention relates generally to the field of photography, and in particular to actuators. More specifically, the invention relates to an electromagnetic actuator with position sensor.

BACKGROUND OF THE INVENTION

In order for an automatic camera to accommodate a range of exposure values, it is necessary for the scene luminance and distance to be measured, and the shutter speed, lens aperture, and focal distance rapidly adjusted accordingly just prior to exposing the photographic film or electronic image sensor in the camera. To effect a correct exposure level upon a photosensitive surface, the adjustments to the shutter speed and lens aperture must be done with a certain degree of accuracy which generally entails the use of either fixed stop positions or some sort of position sensing and feedback control of the aperture or shutter elements. This has been done in the past using Hall Effect devices and optical feedback. Such approaches generally involve relatively costly parts and/or are susceptible to temporal and thermal drift in their output signals.

U.S. Pat. No. 5,172,298, discloses an electromagnetic actuator with position sensing capability. The actuator is an example of a moving iron design which employs a soft magnetic core around which is coaxially placed a drive coil as is commonly used in linear solenoid design. Electrical current passing through the drive coil creates a magnetic field whose flux lines are drawn toward the low reluctance path presented by the core material. The increased potential energy created by this condition is manifested as a force which tends to draw the iron core and attached plunger into the drive coil. This is a unidirectional device and reversal of the current does not create a force in the opposite direction. Consequently, two springs have been provided in the patented device for providing a restoring force to the plunger assembly.

A detection coil is also placed coaxially with the core. As the core moves axially, the "length of the portion of the core which is located within the detection coil varies, thereby varying the inductance of the detection coil." The variable inductance is used to vary the resonant frequency of an electrical oscillator circuit. A frequency-to-voltage conversion circuit is then used to convert the frequency of the output from the oscillator into a proportional voltage signal which is interpreted as an indication of the position of the core/plunger assembly.

SUMMARY OF THE INVENTION

The present invention is directed to overcoming one or more of the problems set forth above. Briefly summarized, according to one aspect of the present invention, an electromagnetic actuator with position sensor includes a core made of a soft magnetic material which is supported to be movable, and a permanent magnet mounted to move with the core. At least one electrically conductive drive coil is located adjacent the core and one pole of the permanent magnet. A casing, made of a soft magnetic material, is located adjacent to the drive coil. An electrically conductive sense coil is located adjacent one end of the core, such that when electrical current is passed through the drive coil in a first direction, the core is moved in a first direction and an electrical property associated with the sense coil is altered, thereby indicating the position of the core; and when electrical current is passed through the drive coil in a second direction, the core is moved in a second direction and an electrical property associated with the sense coil is altered, thereby indicating the position of the core.

The invention described herein employs relatively few low cost parts by combining functions, yet provides adequate levels of precision, resolution, speed, and drift immunity in an electromagnetic actuator. These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The operation of the present invention incorporates two independent electromagnetic phenomena in a single device in order to provide two separate functions; one of a prime mover, another as a position sensing device.

Figure 1:
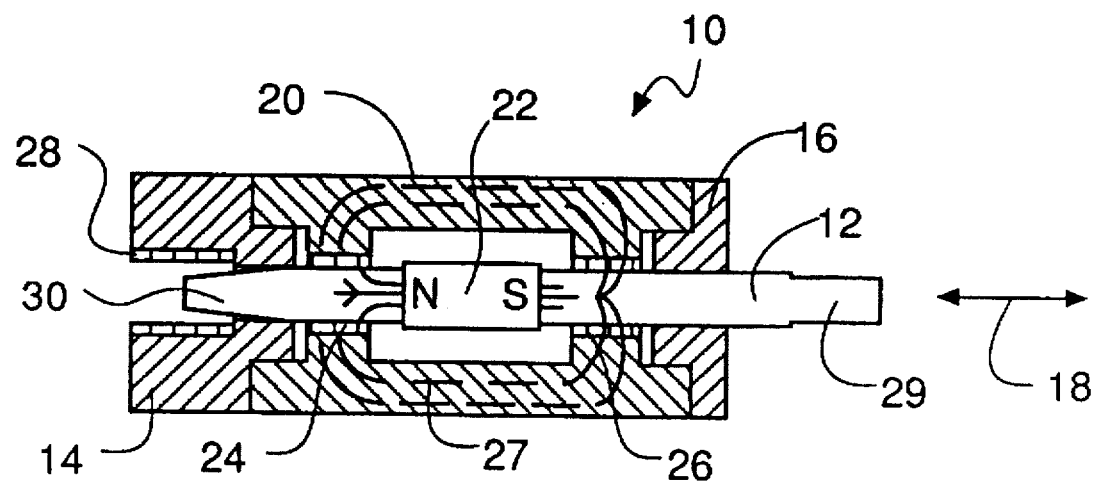
FIG. 1 is a schematic side sectional view of a first embodiment of an electromagnetic actuator with position sensor.

Turning to FIG. 1, a first embodiment of a linear electromagnetic actuator with position sensor 10 includes a core 12 which is made of a soft magnetic material such as steel. Core 12 is supported near both its ends by a pair of bearings, respectively 14, 16. The bearings are made of plastic (e.g. nylon) and allow core 12 to move along a direction indicated by double-headed arrow 18. Bearings 14, 16 are secured to opposite ends of a casing 20 which is made of a soft magnetic material such as steel. A permanent magnet 22 is secured to core 12 and moves with the core.

A pair of drive coils 24, 26 are supported by casing 20 and wrapped about core 12 in close proximity to the core in small air gaps that exist between coils 24, 26 and the core. Casing 20 provides an outer flux path 27 for guiding magnetic flux from permanent magnet 22. The coils are attached to an electrical power supply (not shown). Coils 24, 26 may together constitute one long continuous electrically insulated copper wire, with coils 24 and 26 wrapping about core 12 in opposite directions. Alternatively, coils 24 and 26 can be separate electrically insulated copper wires which conduct their own independent electrical current.

A magnetic circuit is created by permanent magnet 22, core 12, outer flux path 27 and the air gaps between casing 20 and the core. Coils 24, 26 are placed within the aforementioned air gaps in such a manner that when a direct current passes through the coils, Lorentz forces acting in the direction of the coil axis are generated between the permanent magnet/core assembly and the coils, thus propelling the permanent magnet/core assembly in one or another direction as shown by arrow 18. The direction of the force is dependent upon the direction of the current flow and consequently, the device may be operated bidirectionally, obviating the need for any type of external return means (e.g. a spring). The level of direct current determines how much force is exerted upon the core. Consequently, an apparatus requiring actuation, such as a camera shutter, can be attached to an end 29 of the core and driven quickly and precisely to a desired position.

A sense coil 28 is secured to bearing 14 and wraps about a tapered end 30 of core 12 in close proximity to the tapered end. Sense coil 28 is placed coaxially with the magnet/core assembly and has an inductance, and thereby impedance ($X_L = 2\pi fL$, where $X_L$ is the impedance of coil 28, f is the frequency of the AC current into coil 28 and L is the inductance of the combined coil 28 and core 12) which varies as a function of the position of the sliding core within it. Although the device can function properly with a straight cylindrical cross section at end 30 of core 12, the dynamic range of the change in inductance is enhanced by using a tapered or conical cross section for the core's end 30.

Figure 2:
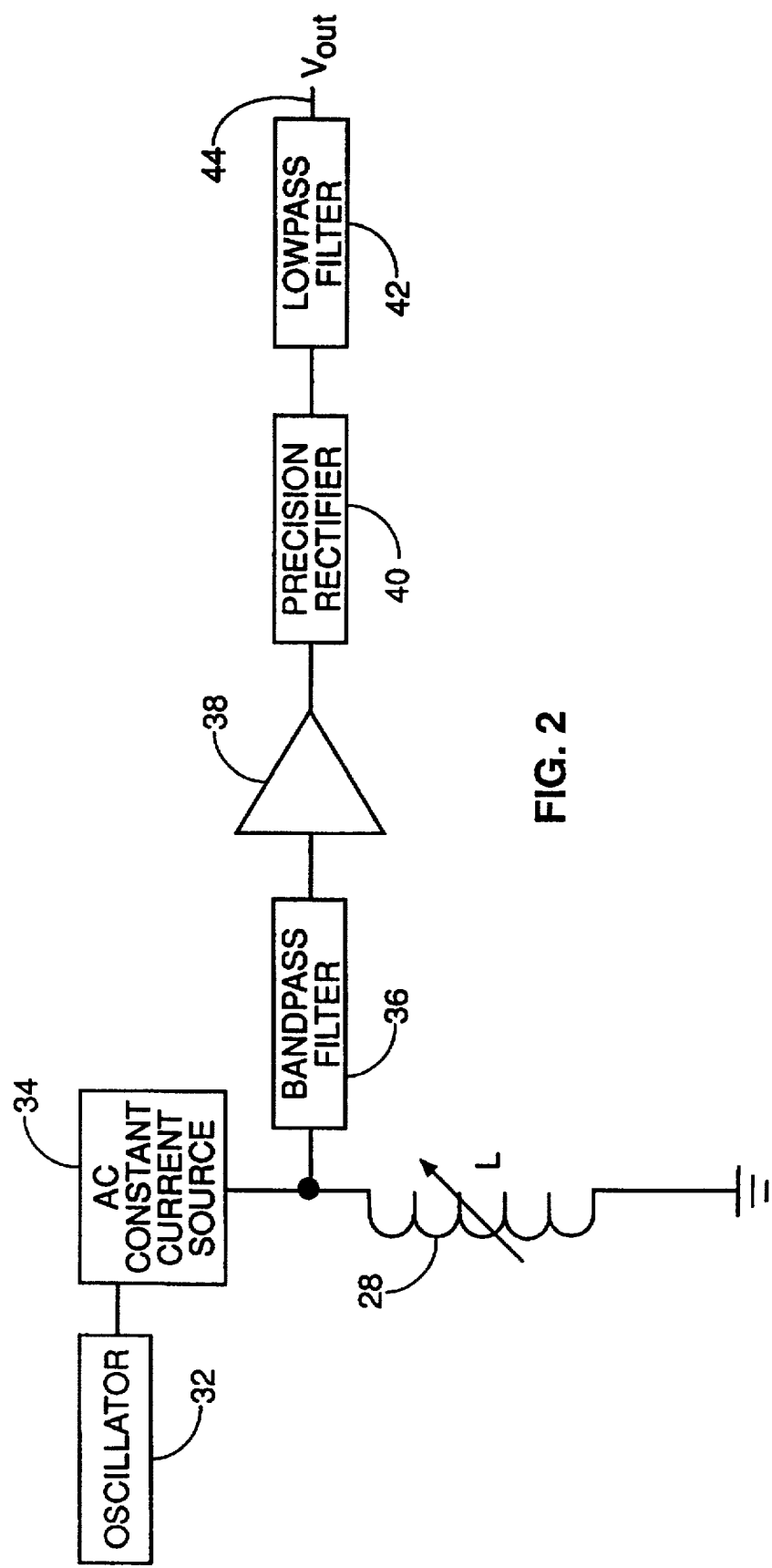
FIG. 2 schematically depicts circuitry used to derive a voltage proportional to the core position in the first embodiment.

FIG. 2 depicts schematically circuitry used to derive a voltage proportional to the core position relative to coil 28 in the first embodiment. The impedance of the sense coil is measured by using a high frequency (Å40 KHz) constant AC current source 34 to maintain a constant current through coil 28 and simultaneously measuring the voltage drop across the coil as an indication of that position. An oscillator 32 of fixed frequency is electrically connected to AC constant current source 34. A bandpass filter 36, centered about the frequency of the aforementioned oscillator, is electrically connected to one end of coil 28, the other end of which is grounded. An amplifier 38 boosts the electrical signal emitted by the bandpass filter. The voltage is subsequently rectified by a precision rectifier 40 and filtered through a low pass filter 42 for signal conditioning, making $V_{out}$ at point 44 suitable for use in a closed loop servo which controls the electrical current supplied to drive coils 24, 26.

Figure 3:
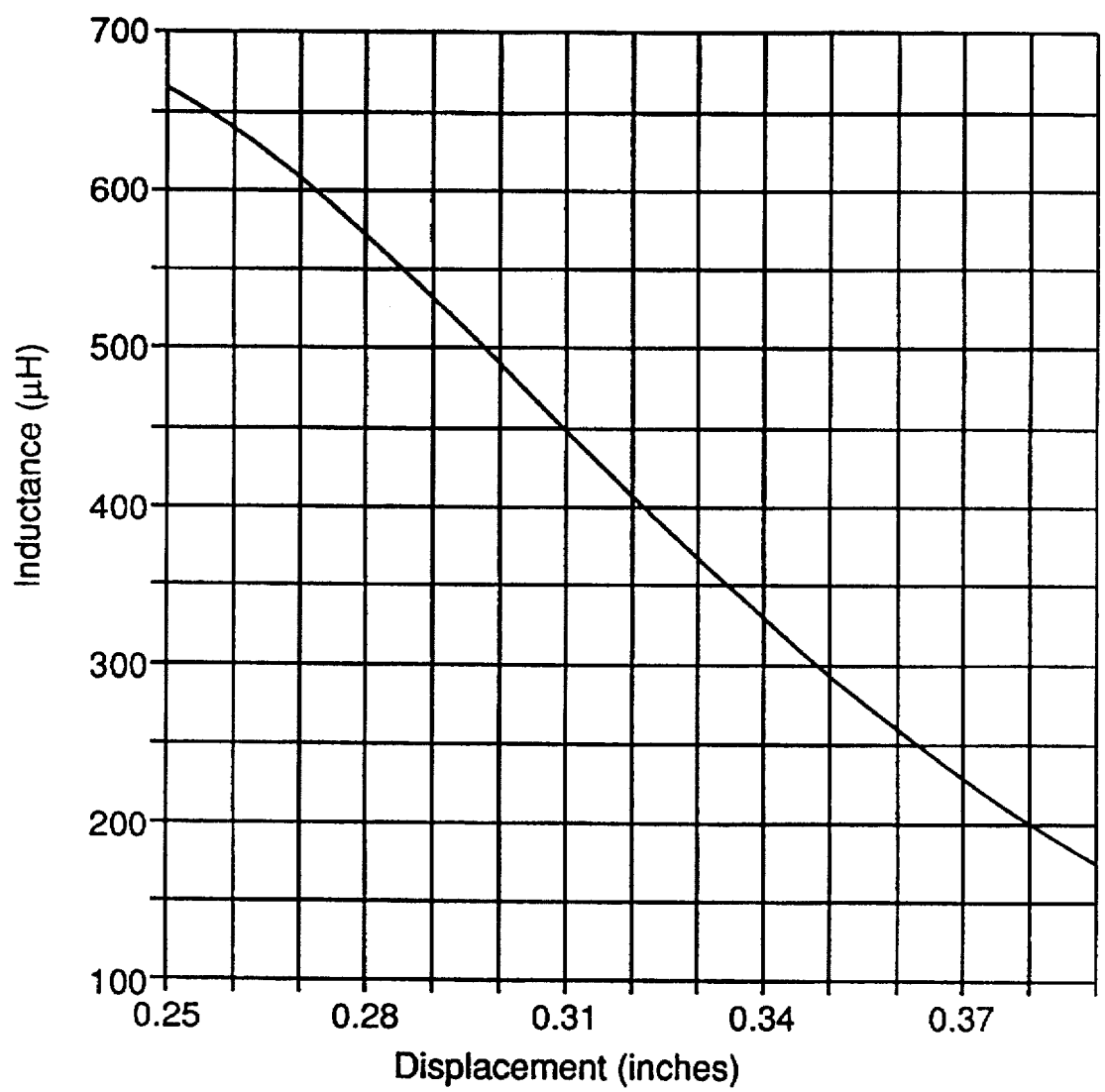
FIG. 3 is a graph of measured sense coil inductance versus core displacement.
Figure 4:
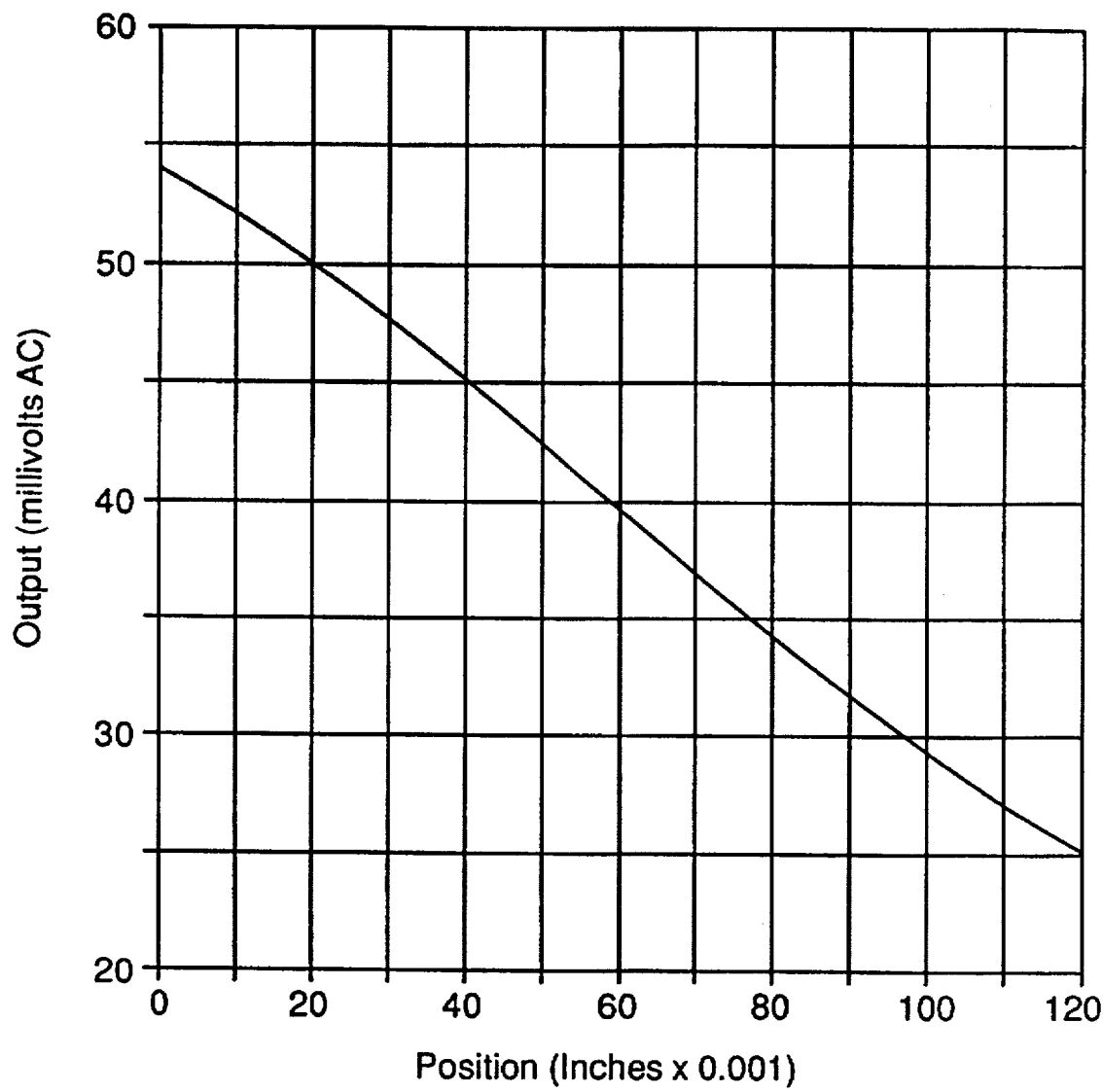
FIG. 4 is a graph of AC voltage measured across the inductor sense coil versus core displacement.
Figure 5:
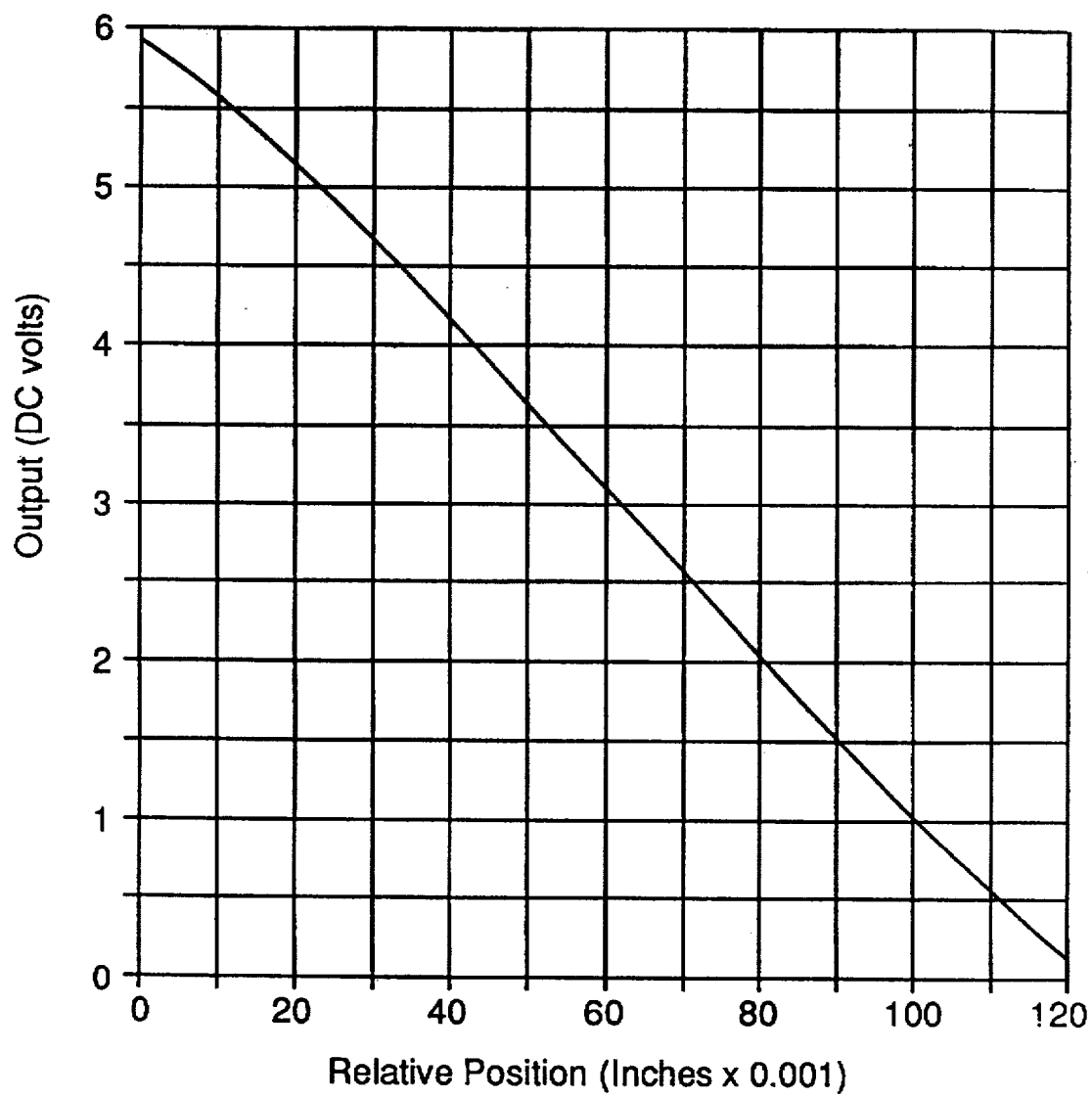
FIG. 5 is a graph of the DC voltage resulting from rectification and filtering of the AC signal.

FIG. 3 discloses a graph of the inductance of coil 28 verses the displacement of the core into coil 28. The further core 12 extends into coil 28, the higher becomes the inductance of coil 28. FIG. 4 is a graph of AC voltage measured across the inductor coil 28 versus core displacement relative to coil 28. FIG. 5 is a graph of the DC voltage at point 44 in the circuit of FIG. 2 resulting from rectification and filtering of the AC signal from amplifier 38. The plots of FIGS. 1 to 3 are based on an input voltage of 40 mV at a frequency of 40 kHz.

Figure 6:
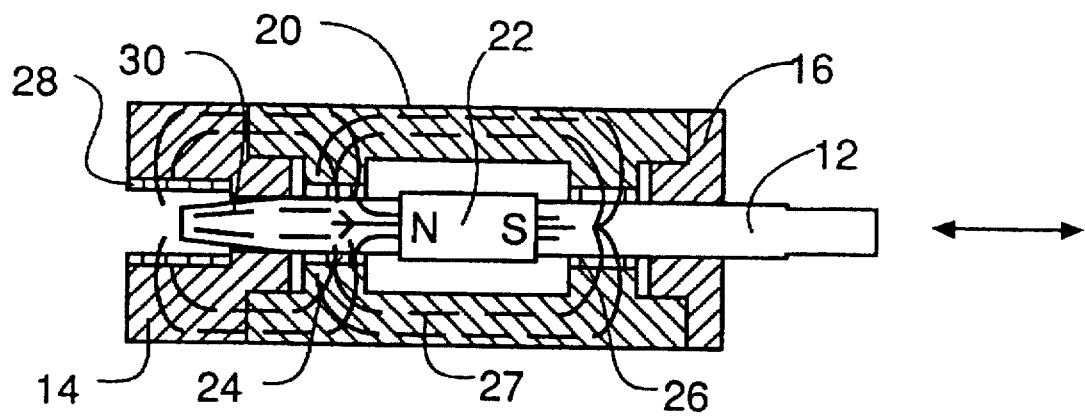
FIG. 6 is a schematic side sectional view of a second embodiment of an electromagnetic actuator with position sensor.

FIG. 6 discloses a second embodiment of the invention which, in many respects, is quite similar to the first embodiment. One major difference is that bearing 14 in the second embodiment is made of a soft magnetic material such as silicon steel, rather than plastic. It is still preferable to maintain a low friction surface, such as plastic, which guides core 12. Another difference is that rather than running just a DC current through drive coils 24, 26, a high frequency (Å40 KHz) time-varying (or AC) current is superimposed upon the primary DC drive current and the sum of the currents flows through drive coils 24, 26. A further difference is that there is no AC current run through sense coil 28.

In this embodiment, a branch of the flux return path 27 functions as the shared core of a transformer circuit including primary and secondary coils (or "windings" in transformer terminology). Thus, as core 12 moves, the amount of magnetic material within coil 28 varies, effecting a change in the efficiency of the transformer action. When a time-varying (AC) voltage generated by an oscillator circuit is applied to drive coils 24, 26, this change in coupling efficiency is manifested as a change in the voltage induced in the secondary winding or coil 28. This effect is well known, and a wide range of devices utilizing this basic principle are referred to as a linear variable transformers (LVT). The induced voltage through the action of the aforementioned transformer is measured to provide an indication of the core position.

Figure 7:
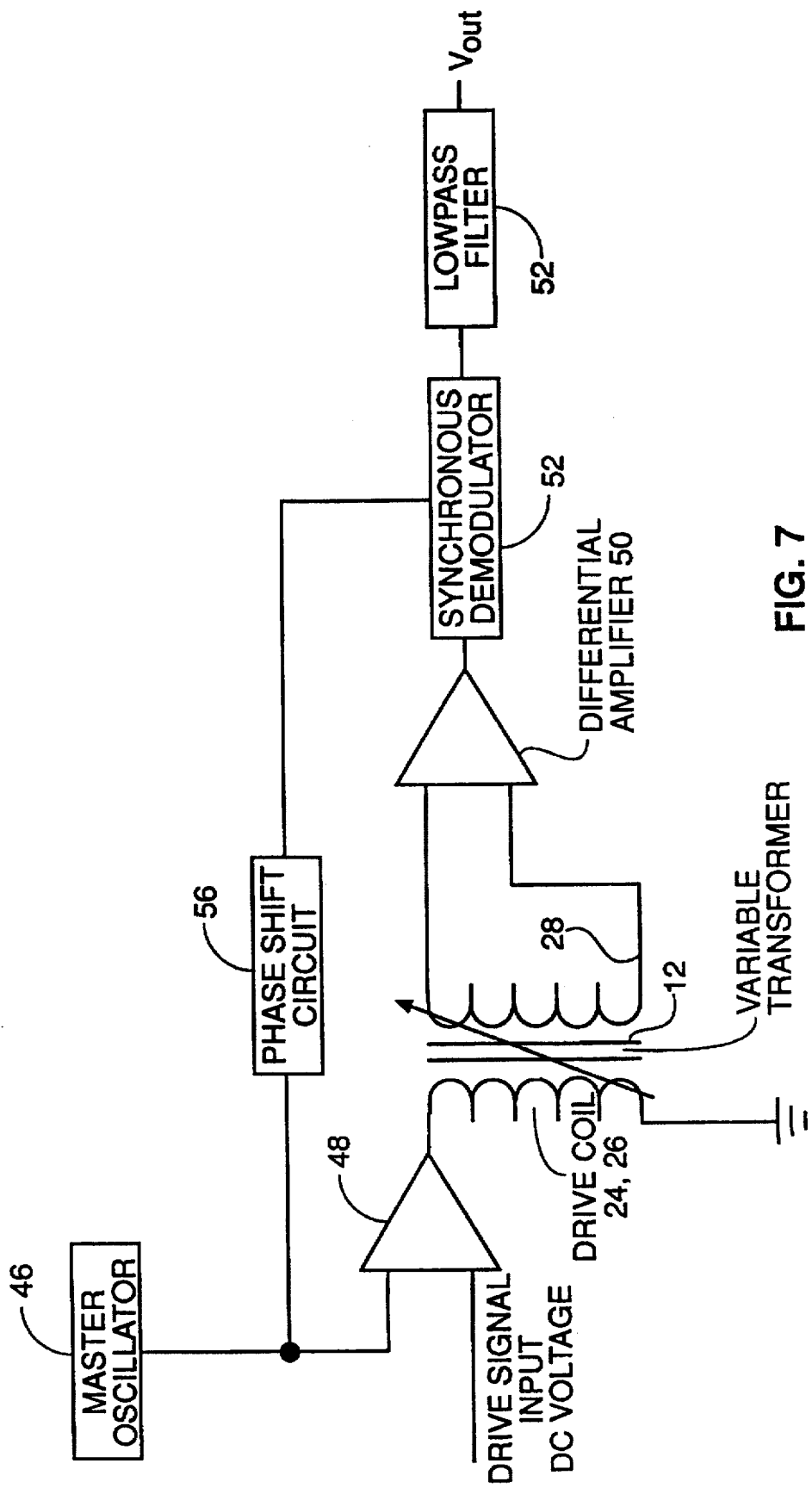
FIG. 7 schematically depicts circuitry used to derive a voltage proportional to the core position in the second embodiment.

FIG. 7 depicts schematically the circuitry used to derive a voltage proportional to the core position in the second embodiment. A master oscillator circuit 46 provides a stable AC voltage to the input of the transformer and, in conjunction with a phase shift circuit 56, enables synchronous demodulation. A summing circuit 48 combines the AC and DC voltages into one composite signal to be applied to drive coils 24, 26. A differential amplifier 50 buffers the induced voltage in the secondary winding (coil 28). A synchronous demodulator 52 detects the amount of phase shifted signal at the excitation frequency which has been coupled into the transformer secondary winding (coil 28). Finally, a low pass filter 54 for signal conditioning, making $V_{out}$ suitable for use in a closed loop servo which controls the electrical current supplied to drive coils 24, 26.

The present invention offers numerous advantages over the prior art, including (a) relatively few parts (e.g. no return springs necessary, fewer parts in the electronic circuitry), (b) higher linearity of operation due to use of a constant frequency oscillator (see graphs of measured performance infra) and (c) thermal variations are easily compensated for by passive compensation components (e.g. resistor or coil, in the feedback loop function well because of inherent linearity of the system).

The invention has been described with reference to a preferred embodiment. However, it will be appreciated that variations and modifications can be effected by a person of ordinary skill in the art without departing from the scope of the invention.

We claim:

1. An electromagnetic actuator with position sensor, comprising:

a core made of a soft magnetic material which is supported to be movable;

a permanent magnet mounted to move with the core;

at least one electrically conductive drive coil located adjacent the core and one pole of the permanent magnet a casing made of a soft magnetic material and located adjacent the drive coil;

an electrically conductive sense coil located adjacent one end of the core, such that when electrical current is passed through the drive coil in a first direction, the core is moved in a first direction and an electrical property associated with the sense coil is altered, thereby indicating the position of the core, and when electrical current is passed through the drive coil in a second direction, the core is moved in a second direction and an electrical property associated with the sense coil is altered, thereby indicating the position of the core; and a bearing made of a soft magnetic material for supporting the one end of the core located adjacent the sense coil, wherein the electrical current passed through the drive coil includes a direct current component and an alternating current component, and wherein the alternating current component induces an alternating current in the sense coil via the bearing and core, such that a voltage drop across the sense coil can be measured to indicate the position of the core.

2. The actuator of claim 1, wherein the permanent magnet is mounted on the core.

3. The actuator of claim 1, wherein the drive coil is wrapped about the core adjacent one pole of the permanent magnet.

4. The actuator of claim 1, wherein the drive coil is wrapped about the core adjacent both poles of the permanent magnet.

5. The actuator of claim 4, wherein the drive coil includes two separate drive coils capable of conducting independent electrical currents.

6. The actuator of claim 1, wherein the casing surrounds the drive coil, permanent magnet and at least part of the core.

7. The actuator of claim 1, wherein the electrical property associated with the sense coil is the sense coil's impedance which is measured by passing an alternating current through the sense coil and measuring a voltage drop across the sense coil.

8. The actuator of claim 1, wherein the one end of the core adjacent the sense coil is tapered.

9. An electromagnetic actuator with position sensor, comprising:

a core made of a soft magnetic material which is supported to me movable;

a permanent magnet mounted to move with a core;

at least one electrically conductive drive coil located adjacent the core and one pole of the permanent magnet a casing made of a soft magnetic material and located adjacent the drive coil;

an electrically conductive sense coil located adjacent one end of the core, such that when electrical current is passed through the drive coil in a first direction, the core is moved in a first direction and an electrical impedance of the sense coil is altered; and when electrical current is passed through the drive coil in a second direction, the core is moved in a second direction and the electrical impedance associated with the sense coil also is altered;

an alternating current source connected to maintain current through the sense coil; and a circuit connected to the sense coil to measure a voltage drop across the sense coil as an indication of the position of the core.

10. The actuator of claim 9, wherein the permanent magnet is mounted on the core.

11. The actuator of claim 9, wherein the drive coil is wrapped about the core adjacent one pole of the permanent magnet.

12. The actuator of claim 9, wherein the drive coil is wrapped about the core adjacent one pole of the permanent magnet.

13. The actuator of claim 12, wherein the drive coil includes two separate drive coils capable of conducting independent electrical currents.

14. The actuator of claim 9, wherein the casing surrounds the drive coil, permanent magnet and at least part of the core.

15. The actuator of claim 9, wherein the one end of the core adjacent the sense coil is tapered.

16. An electromagnetic actuator with position sensor, comprising:

a core made of a soft magnetic material which is supported to be movable, the core having a tapered end;

a permanent magnet mounted to move with the core;

at least one electrically conductive drive coil located adjacent the core and one pole of the permanent magnet;

a casing made of a soft magnetic material and located adjacent the drive coil;

an electrically conductive sense coil located around the tapered end of the core, such that when electrical current is passed through the drive coil in a first direction, the core is moved in a first direction and the tapered end moves within the sense coil so that an electrical inductance of the sense coil is altered, thereby indicating the position of the core; and when electrical current is passed through the drive coil in a second direction, the core is moved in a second direction and the tapered end moves within the sense coil so that the electrical inductance of the sense coil also is altered, thereby indicating the position of the core.

17. The actuator of claim 16, wherein the permanent magnet is mounted on the core.

18. The actuator of claim 16, wherein the drive coil is wrapped about the core adjacent one pole of the permanent magnet.

19. The actuator of claim 16, wherein the drive coil is wrapped about the core adjacent both poles of the permanent magnet.

20. The actuator of claim 19, wherein the drive coil includes two separate drive coils capable of conducting independent electrical currents.

21. The actuator of claim 16, wherein the casing surrounds the drive coil, permanent magnet and at least part of the core.

22. The actuator of claim 16, further comprising a circuit for determining the position of the core by passing an alternating current through the sense coil and measuring a voltage drop across the sense coil.

* * * * *